Patented May 25, 1954

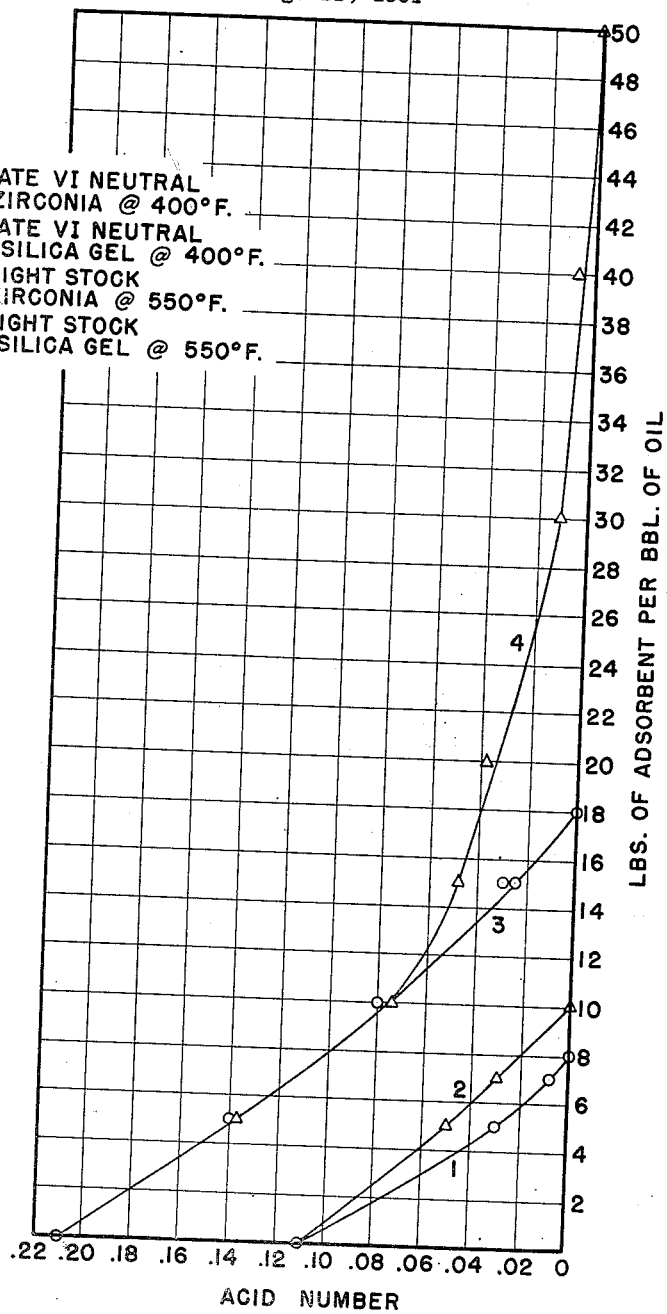
CONTACT TREATMENT OF HYDROCARBON OILS

2,679,471

UNITED STATES PATENT OFFICE 2,679,471

PROCESS FOR REFINING HYDROCARBON LIQUIDS

George W. Ayers, Chicago, and Walter J. Sandner, Carpentersville, Ill., assignors to The Pure Oil Company, Chicago, Ill., a corporation of Ohio Application August 11, 1951, Serial No. 241,456

3 Claims. (Cl. 196—147)

This invention relates to a process for refining liquid hydrocarbons and, more particularly, to a new adsorbent and adsorbent composition therefore. The purpose of conventional adsorptive refining processes is to improve the color, odor and other physical properties of the product. Under ordinary conditions, only a small proportion of any organic acids present is removed. The present invention is directed especially to the substantial removal of organic acids from liquid hydrocarbons.

It is known that certain porous materials having ultra-microscopic interstices will adsorb specific solutes from solution under favorable conditions. Such materials are used in processes whereby the solution to be treated is contacted with the adsorbing material, followed by a desorbing process to free the adsorbed substances so that the adsorbent may be used again. Certain materials having particular physical characteristics have been found to be particularly useful in adsorbing certain impurities from solutions. Adsorbent materials having a pore size such that they will adsorb only a particular minimum of water vapor under certain conditions are disclosed by W. A. Patrick and E. B. Miller in their United States Patent 1,678,298 as being especially adapted to such processes. Such adsorbent materials as silica gel, activated charcoal, and gels of metal oxides are disclosed by Patrick and Miller as very suitable materials when prepared in a particular manner so as to impart thereto a honeycomb structure which will take up large amounts of water.

It has now been discovered that precipitated hydrous zirconia (zirconium oxide) is peculiarly suitable for refining lubricating oil stocks, for the removal of acidic substances therefrom, as for example the naphthenic acids, and lowering the acid number of the product.

Throughout the specification, the term "dried or hydrous zirconia" will be used to indicate a zirconia which has been prepared by precipitation from a zirconium salt, is not a dried gel, does not contain a honeycomb structure and is dried only to take out occluded water, leaving only minute quantities of water of hydration in the product. Such a product has been found to be superior to other adsorbents as a contact agent for producing zero acid number neutral oils and bright stocks. The zirconia may be obtained in a dry powder condition or prepared from a paste form. Such dried hydrous zirconia adsorbs organic acids in preference to color bodies, without any substantial effect on the flash, viscosity, sulfur content, pour point, or ash content of the oil, whereas the commonly used adsorbing agents are more specific with regard to color bodies and generally effect differences in the physical characteristics enumerated.

It is therefore a primary object of this invention to provide a process for refining liquid hydrocarbons using zirconia as the principal adsorbent.

A second object of this invention is to provide a method of removing organic acids from liquid hydrocarbons including lubricating oil stocks by contact with finely divided zirconium oxide without substantially affecting the physical properties of the hydrocarbons.

A third object of this invention is to treat lubricating oil stocks with finely divided zirconia to produce thereby a substantial reduction of acidity in the oils with no build-up in the ash content of the treated oil.

A fourth object of this invention is to provide a method for the removal of naphthenic acids and their derivatives from bright lubricating oil stocks.

A fifth object of this invention is to provide a method for removing organic acids from lubricating oils by contact with dried precipitated zirconia containing only minute quantities of water of hydration.

A further object of this invention is to treat neutral lubricating oils and especially bright lubricating stocks with dried precipitated hydrous zirconia to produce products having a zero acid number in a very efficient manner.

Further objects of this invention will become apparent as the description thereof proceeds.

Although the invention relates to a method of removing organic acids from lubricating oils using hydrous zirconia generally, it will be demonstrated by a comparison of several known adsorbents therewith in the treatment of three typical lubricating oil stocks using dried hydrous zirconia. One such stock is raw dewaxed 200 viscosity neutral obtained from Mid-Continent crude and having an original acid number of 3.3 as determined by A. S. T. M. method D974–48T. A second neutral stock of intermediate viscosity and having an acid number of 0.11 was also used. A high V. I. 150 vis. at 210° F. bright stock having an acid number of 0.21 was similarly tested. The physical characteristics of these three lubricating oil stocks are given in the following table:

TABLE I

*Physical characteristics of lubricating oil stocks*

| Stock | A. P. I. Gravity | Flash | Fire | Vis./100° F. | Vis./130° F. | Vis./210° F. | NPA Color | Pour | Percent S | C. R. | V. I. |
|---|---|---|---|---|---|---|---|---|---|---|---|
| Raw Dewaxed 200 Vis. Neutral | 22.4 | 435 | 500 | 356 | 159 | 51.4 | 7+ | 0° F. | 1.23 | 0.1 | 60 |
| Intermediate V. I. 200 Vis. Neutral | 29.4 | 425 | 470 | 200 | 104 | 45.9 | 1½ | +5 | | 0.0 | 90 |
| High V. I. 150 Vis. at 210° F. Bright Stock | 26.6 | 570 | 630 | 2,180 | 838 | 141.4 | +5 | +5° F. | 0.47 | 0.68 | 98 |

Samples of precipitated hydrous zirconia were obtained from the Titanium Alloy Manufacturing Division of the National Lead Company. This hydrous zirconia was a greenish-white paste containing 68–69% water by weight. The hydrous zirconia was dried in an oven at 350° F. for 24 hours. At the end of this time the water content was negligible. The drying is necessary since rapid addition of the hydrous zirconia without drying to the heated lubricating oils would result in experimental difficulties, such as foaming during the process. Powdered precipitated zirconia may also be used. The dried zirconia was used in the following experiments:

*Example 1.*—Two hundred eighty-one cc. of raw dewaxed 200 neutral stock of 3.3 acid number (A. S. T. M. D974–48T) was blanketed with nitrogen and heated to 400° F. with mechanical stirring. Sixteen and one-tenth grams of the prepared zirconia (20 lb./bbl. dry basis) was added to the hot oil and the stirring was continued for ten minutes. After cooling to 310° F. the mixture was filtered by suction through Celite. The acid number of the finished oil was 2.2 and the ash was 0.00%.

*Example 2.*—A phenol-treated and dewaxed neutral oil of 0.11 acid number was contacted with dried zirconia. Several treats were made using various amounts of zirconia. The treating conditions were the same as in Example 1. The oil was blanketed with nitrogen and, while stirring, heated to 400° F. The zirconia was then added and the mixture was stirred for ten minutes. The contacted oil was filtered by suction through Celite. An 8 lb./bbl. zirconia treat produced a 0.00 acid number oil.

*Example 3.*—A phenol-treated and dewaxed bright stock of 0.34 acid number was contacted with dry zirconia. Several treats were made using various amounts of zirconia. The oil was blanketed with nitrogen and while stirring, heated to 550° F. The zirconia was then added and the mixture was stirred for ten minutes. The contacted oil was filtered by suction through Celite. An 18 lb./bbl. zirconia treat produced a 0.00 acid number oil.

The amount of zirconia required for a given lubricating oil stock will vary depending on the acid number of the stock and the acid number reduction which is required by the treatment. By adjustment of the ratio of lubricating oil stock to dried zirconia proportionate reductions in acid number approaching zero acid number may be attained. In general, temperatures from subatmospheric to 550° F. may be used. The temperature will vary as the physical characteristics of the lubricating oil stock vary and the economics of the process dictate. Lower temperatures than 350° F. require longer contact times. Best results are obtained within the temperature range of 200°–570° F.

The hydrous zirconia used is preferably a precipitated form of zirconia since in subsequent drying this form yields a large surface area which facilitates the adsorption. Unlike metal oxide gels having intricate interstices which are destroyed by drying, the zirconia of the present invention is enhanced by drying. Although minute traces of water have little or no effect on the efficiency of the process, the best and most consistent results are obtained in the substantial absence of water. Various filter aids may be incorporated during the treatment, such as Celite or filter aid materials suitable for rotary filters. The presence of an inert atmosphere is for the purpose of protecting the lubricating oil stock from oxidation during the adsorption. For this purpose, other inert gases than nitrogen may be used. Without the presence of an inert gas, there is the danger of discoloration of the finished product.

In order to further demonstrate the invention, a comparison was made of the extent of adsorption of organic acids by dried hydrous zirconia and by various other adsorption agents known and used in the art. The results are shown in the following table:

TABLE II

*Treatment of oils with various contacting agents*

| No. | Oil Used | Contacting Agent | Lbs. Contacting Agent/bbl. Oil | Contacting Temp. (° F.) | Contacting Time (Min.) | Acid No. of Contacted Oil |
|---|---|---|---|---|---|---|
| | | | | | | 3.3 |
| 1 | Raw Dewaxed 200 Vis. Neutral | Dried Hydrous Zirconia | 20 | 400 | 10 | 1.9 |
| 2 | do | 300 Mesh Attapulgus Clay | 20 | 400 | 5 | 2.8 |
| 3 | do | 8–50 Mesh Commercial Sodium Zeolite | 20 | 400 | 15 | 2.0 |
| 4 | do | 100 Mesh Unwashed Sodium Zeolite | 20 | 400 | 10 | [1] 1.4 |
| 5 | do | 350 Mesh Washed Sodium Zeolite | 20 | 400 | 10 | 2.2 |
| 6 | do | | | | | 0.11 |
| 7 | Intermediate V. I. 200 Vis. Neutral | Dried Hydrous Zirconia | 8 | 400 | 10 | 0.00 |
| 8 | do | do | 7 | 400 | 10 | 0.01 |
| 9 | do | do | 5 | 400 | 10 | 0.03 |
| 10 | do | 200 Mesh Silica Gel | 10 | 400 | 10 | 0.00 |
| 11 | do | do | 7 | 400 | 10 | 0.03 |
| 12 | do | do | 5 | 400 | 10 | 0.05 |
| 13 | do | | | | | 0.21 |
| 14 | High V. I. 150 Vis. Bright Stock | Dried Hydrous Zirconia | 18 | 550 | 10 | 0.00 |
| 15 | do | do | 15 | 550 | 10 | 0.03 |
| 16 | do | do | 10 | 550 | 10 | 0.08 |
| 17 | do | do | 5 | 550 | 10 | 0.14 |
| 18 | do | 200 Mesh Silica Gel | 50 | 550 | 10 | 0.00 |
| 19 | do | do | 40 | 550 | 10 | 0.01 |
| 20 | do | do | 30 | 550 | 10 | 0.01 |
| 21 | do | do | 20 | 550 | 10 | 0.04 |
| 22 | do | do | 15 | 550 | 10 | 0.05 |
| 23 | do | do | 10 | 550 | 10 | 0.08 |
| 24 | do | do | 5 | 550 | 10 | 0.14 |
| 25 | do | | | | | |

[1] The contacted oil gave an alkaline ash; all other contacted oils were ash free.

The raw dewaxed 200 vis. neutral stock used in runs numbered 1–6 had not been previously solvent-treated nor contact-treated with adsorbent. The intermediate V. I. 200 vis. neutral stock and the high V. I. 150 vis. bright stock had been solvent-refined and previously contact-treated with Filtrol contact clay before use. In each experiment the contacting was conducted in an atmosphere of nitrogen and after the adsorption agent had been in contact with the lubricating oil for the times and at the temperatures indicated, the hot mixtures were filtered through filter paper using Celite as a filter aid. The acid numbers were all determined by A. S. T. M. method D974-48T.

In order to further demonstrate the comparative effectiveness of dried zirconia and 200 mesh silica gel in adsorbing organic acids from lubricating oils, a series of curves were plotted with acid number of contacted oil as ordinates and the pounds of contacting agent required as abscissa, using the data from Table II. These curves are shown in the graph. The results show that dried hydrous zirconia is very effective in removing organic acids from lubricating oil, requiring a lesser ratio of contacting agent to lubricating oil to yield a given acid number reduction. Further, the data show that dried zirconia will efficiently reduce the acid number to zero, a property not shared by the other absorbents.

The silica gel and Attapulgus clay used in these experiments were fresh materials having been prepared to yield maximum adsorptive characteristics for organic acids as is taught in the prior art. An alternative procedure according to the present invention comprises first contacting the hydrocarbon liquid to be treated with an adsorbent adopted to reduce the acid number thereof to a point approaching zero, as between about 0.08 and 0.04 and then treating the resultant hydrocarbon liquid with dried zirconia to effect the final reduction of the acid number to zero. This step-wise reduction of the acid number amounts to an economy since the major portions of the acid are removed by inexpensive adsorbents and only a small amount of the more expensive zirconia need be used to accomplish the adsorption of the last traces of organic acids. For this purpose, the first step may be conducted using silica gel, Attapulgus clay, zeolite, and to a lesser extent various metal oxides like iron oxide, tin oxide, aluminum oxide, tungstic oxide, and the like. These latter adsorbents may be used in gel form. The conditions of contacting are varied in accordance with the optimum adsorptive characteristics of the adsorbent used, depending on the acid content or acid number of the hydrocarbon liquid and the particular hydrocarbon liquid being treated. With silica gel or Attapulgus clay, temperatures above about 400° F. are operable with contact times of ten minutes or more.

When using dried hydrous zirconia as the single contacting agent for a neutral lubricating oil stock, the temperature of contacting may be from 350°–450° F. The treatment of a bright stock is facilitated by slightly higher temperatures ranging from 500°–600° F. These temperature limitations may be varied to attain suitable liquid-solid inter-face conditions between the hydrocarbon oil and the zirconia. In general, the temperature should be above 200° F. The preferred temperature for a neutral stock is about 390° F. to 420° F. and the preferred temperature of treatment of a bright stock is about 520°–570° F.

The dried hydrous zirconia may be regenerated, after it has been used in treating hydrocarbon liquids in accordance with the invention, by extraction with naphtha, followed by steaming to remove the adsorbed naphtha. If dry steam is used, the regenerated adsorbent is ready for reuse, since there will be substantially no occluded water in the regenerated zirconia. Another method of regeneration comprises passing a hot inert gas through the zirconia. Suitable gases are carbon dioxide and nitrogen.

In the foregoing description of the invention, the preferred embodiments of the invention have been described in some detail and variations thereon have been pointed out. It is to be understood that these preferred embodiments are only for purposes of illustration and clarity, and the invention is not to be regarded as limited to the details of operation described, nor is it dependent on the soundness of any theories advanced. This invention finds as its only limitations the appended claims.

What is claimed is:

1. The method of preparing mineral oil lubricating oil having substantially a zero acid number comprising contacting an organic acid-containing petroleum lubricating oil stock with a solid adsorptive agent other than zirconia and selected from the group consisting of silica gel, clays, zeolites, and metal oxide gels at elevated temperature in sufficient quantity to substantailly reduce the acid number of the oil but insufficient to reduce the acid number to zero and then contacting the oil stock with a non-gel, dried, precipitated zirconia, substantially free of water, in an inert atmosphere at temperatures of about 350° to 570° F. in sufficient quantity and for a sufficient period of time to reduce the acid number of the oil stock to zero.

2. Method in accordance with claim 1 in which the oil stock is a neutral stock, the solid adsorptive agent is a clay, the amount of zirconia is about eight pounds per barrel of oil and the temperature of treatment is about 390°–420° F.

3. Method in accordance with claim 1 in which the oil stock is a bright stock, the solid adsorptive agent is a clay, the amount of zirconia is about eighteen pounds per barrel of oil and the temperature of treatment is about 520°–570° F.

References Cited in the file of this patent

UNITED STATES PATENTS

| Number | Name | Date |
|---|---|---|
| 2,057,629 | Morrell et al. | Oct. 13, 1936 |
| 2,234,367 | Chesny | Mar. 11, 1941 |
| 2,340,939 | Davis et al. | Feb. 8, 1944 |
| 2,375,596 | Strickland | May 18, 1945 |
| 2,487,806 | Hermanson et al. | Nov. 15, 1949 |
| 2,574,434 | Greentree et al. | Nov. 6, 1951 |
| 2,618,586 | Hendel | Nov. 18, 1952 |

OTHER REFERENCES

Sachanen, The Chemical Constituents of Petroleum, Reinhold Publishing Corp., 330 West 42nd St., N. Y., pages 320 and 321 (1945).